United States Patent [19]

Hodgson et al.

[11] Patent Number: 5,400,492

[45] Date of Patent: Mar. 28, 1995

[54] PIPE TREATING METHOD AND APPARATUS

[75] Inventors: Steven T. Hodgson, Hampshire; Christopher R. Hodgson; David J. Jarman, Hampshire, all of England

[73] Assignee: Periquip Services Limited, Hampshire, England

[21] Appl. No.: 18,745

[22] Filed: Feb. 17, 1993

[30] Foreign Application Priority Data

Feb. 18, 1992 [GB] United Kingdom ............... 9203452

[51] Int. Cl.6 .................. B23P 6/00; F16L 55/18
[52] U.S. Cl. ...................... 29/402.08; 29/26 A; 29/426.3; 29/426.4; 29/282; 408/24; 408/25; 408/31; 137/15; 137/318
[58] Field of Search ............... 29/26 A, 26 B, 402.03, 29/402.08, 426.2, 426.3, 426.4, 801, 281.6, 282; 137/15, 315, 317, 318; 408/24, 31, 25, 92, 95

[56] References Cited

U.S. PATENT DOCUMENTS 3,357,445 12/1967 Daugherty ................ 408/92 X
3,773,067 11/1973 Ray ......................... 137/318
3,822,718 7/1974 Peterson ..................... 137/317
3,995,655 12/1976 Sands ...................... 408/92 X
4,431,017 2/1984 Willemsen ................. 408/92 X
4,497,332 2/1985 Sewell et al. ............. 137/317 X
5,099,868 3/1992 Weber ..................... 137/315 X

FOREIGN PATENT DOCUMENTS 47-13840 4/1972 Japan ...................... 408/92
1582940 1/1981 United Kingdom ......... 137/15

*Primary Examiner*—Tom Hughes

[57] ABSTRACT

A device and method for removing a branch fitting from a tapped hole in a main water distribution pipeline under pressure includes a water-tight housing adapted to fit on to the pipeline over the fitting. A cutter is provided within the housing to sever the fitting and other devices include a tool holder for use in removing a part of the fitting left in place after severing. Thus, the fitment can be removed and replaced without closing off the water supply within the main distribution pipeline.

16 Claims, 4 Drawing Sheets

PIPE TREATING METHOD AND APPARATUS

BACKGROUND OF THE INVENTION

This invention relates to a tool for treating pipes and a method of treating such pipes.

It has been common practice to supply domestic water to consumers by means of one or more pipes which lead from a main distribution pipeline into the domestic premises. Generally the main distribution pipeline extends outside the boundary of a number of premises and a right-angled pipe fitting, known as an elbow, is tapped into the main distribution pipeline at a convenient point adjacent each of the premises.

If the domestic feedpipe deteriorates and has to be removed then the water supply to the main distribution pipeline has hitherto had to be shut off, i.e. the line made dead, before repair work is carried out. This causes inconvenience to the neighbourhood which is fed by that distribution pipe.

It had been, in the rather distant past, a fairly common practice to provide a main distribution pipe of iron and an elbow fitting of cast brass onto which was swaged a lead pipe, which pipe then led into the domestic premises. Various health and safety regulations are now being introduced which necessitate the replacement of lead pipes by pipes of inert material such as plastics. As a result a great number of pipe replacement operations will be taking place throughout Great Britain and other countries and there is thus a need for these operations to be performed without shutting down the water supply in the main distribution pipes.

SUMMARY OF THE INVENTION

Accordingly, a general object of the invention is to provide improvements in relation to apparatus for removing and replacing the domestic supply pipe and its associated elbow while the main distribution pipeline is live, and/or to make improvements generally.

According to the invention there is provided a method and apparatus for treating pipes as claimed in the accompanying claims.

By providing a device for severing and replacing a connector from a water supply service pipe which comprises a body or housing removeably securable in water-tight condition to the service pipe, the body providing means for rotatably supporting a cutter adapted to sever the connector from its operative connection to the service pipe within the body or housing, and valve means within the body adapted to prevent egress of fluid from the live service pipe when the connector is severed therefrom, it has been found that it is possible to operate upon and adapt existing pipelines without the need for shutting off the supply in the main distribution pipes.

In a preferred embodiment the device is further provided with means for removing any residual portion of the connector from the service pipe after the severed part has been removed, and replacing the connector with, for example a ferrule assembly which may then be connected to the replacement domestic pipe. All of these stages are carried out within the body or housing, and thus in a water-tight condition.

BRIEF DESCRIPTION OF THE DRAWINGS

Certain aspects of the invention will come to light from the following description which is given by way of example only with reference to the accompanying drawings in which.

DESCRIPTION OF PREFERRED EMBODIMENTS

Figures 1A, 1B:
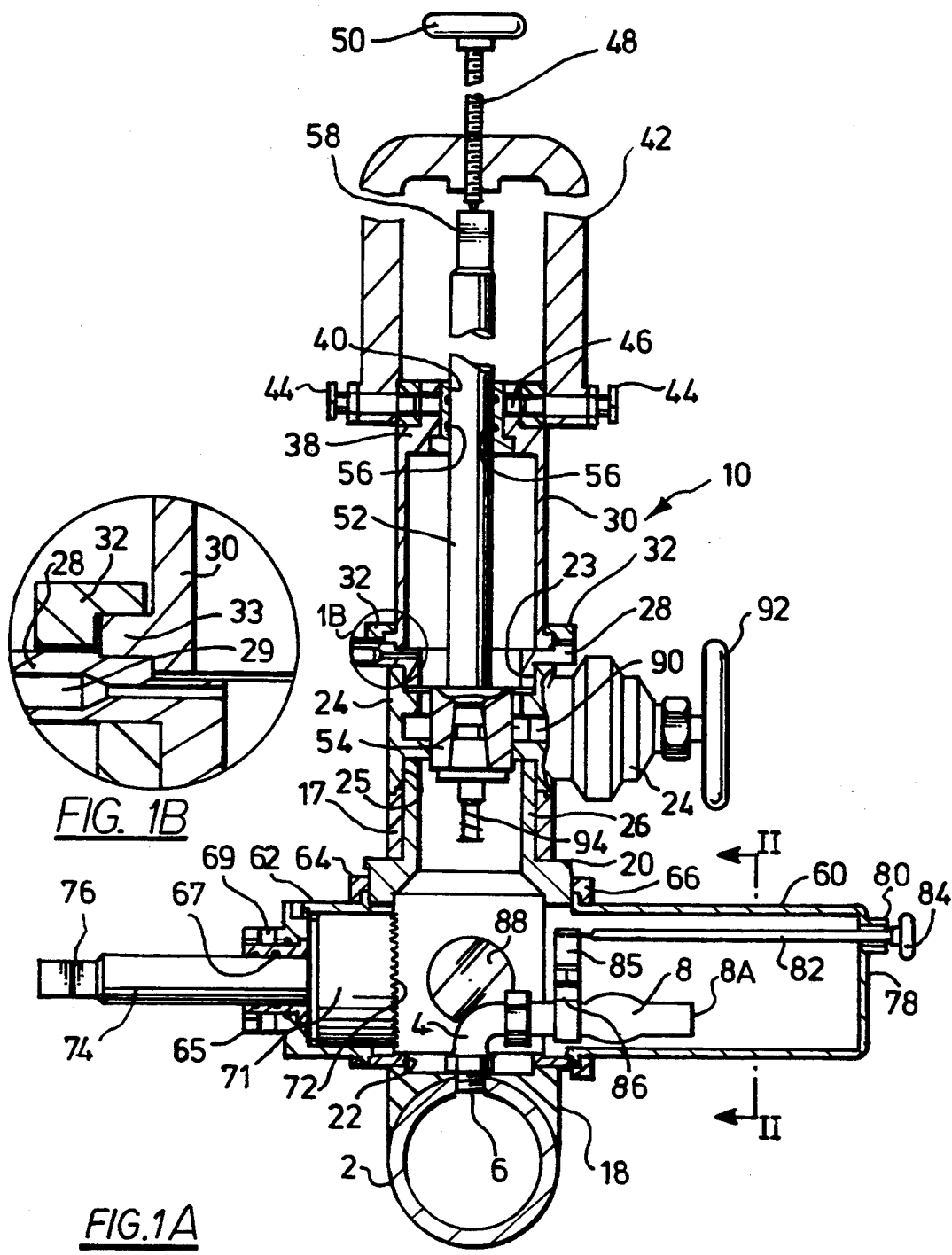
FIG. 1A is the vertical section view of apparatus according to the invention.
FIG. 1B is an enlarged partial view of the clamping plate for securing the bell housing to the adapter plate.

As seen in the drawings a waterpipe supply includes a main distribution pipeline 2 and an elbow 4 is screwed into an upper part of that line at 6. A horizontal part of the elbow is formed with a swelling around which a domestic pipe 8 is swaged. This arrangement is commonplace in the water supply industry.

In order to remove and replace the domestic pipeline 8, particularly if it comprises lead piping, or if the pipe 8 is irreparably damaged, then not only the pipe itself but also the elbow 4 needs to be removed.

In order to accomplish this without the need to shut off the feed to the main distribution pipeline the domestic pipe 8 is first flattened to prevent any flow along that pipe from the main pipeline 2, and the pipe is severed at 8A. This has been common practice within the industry for many years.

An attachment 10 is provided and is adapted to be temporarily mounted on the main pipeline 2 by means of chains 12 which are passed underneath the pipe and tensioned by means of screw and nut devices 14 fitted to a chain mounting unit 16 which constitutes part of the attachment. The unit 16 comprises a central boss 17 and a pair of arms 19 one of which arms extend outwardly from each side of the boss. The arms are interconnected by cross-pieces 21 which have plain holes formed therein.

Figures 2A, 2B:
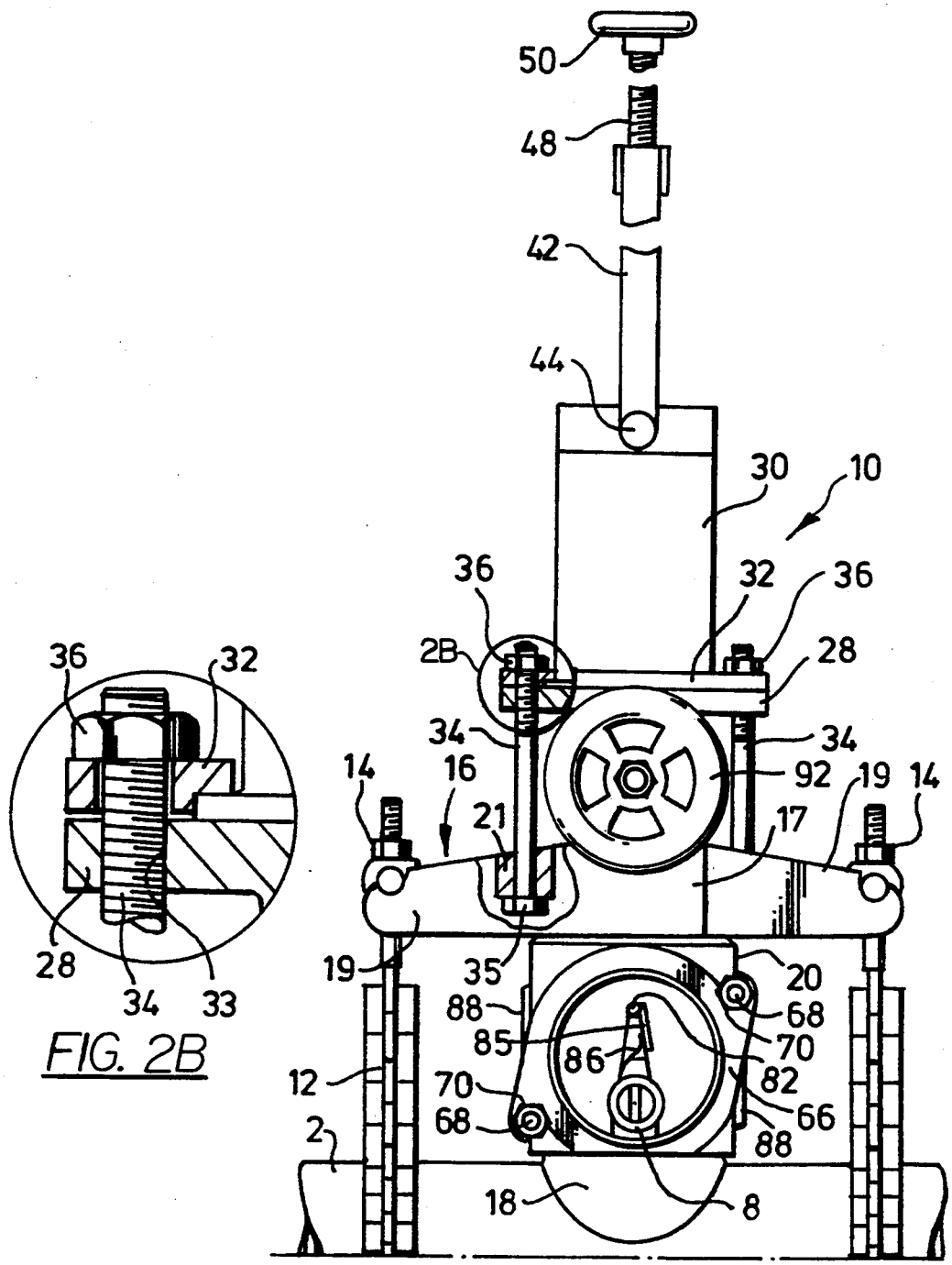
FIG. 2A is an end elevation partly in section on the line II—II of FIG. 1A.
FIG. 2B is an enlarged partial view of the tie rods holding the crosspieces of the chain mounting unit.

A resilient saddle 18 is contoured to fit on the upper part of the periphery of the main pipeline 2 and a housing 20 provided with a circular bore at its lowermost end fits over an upstanding spigot 22 formed on the saddle. Thus the housing 20 can be swivelled about a vertical axis with respect to the pipeline 2 and resilient saddle 18. A valve housing 24 having cylindrical bores 23 and 25 is mounted for pivoting around a cylindrical upstanding part 26 of the housing 20 and is clamped thereto by an adapter plate 28. The adapter plate is formed with a bleed valve 29 and has a downwardly depending boss which locates with the bore 23 of the valve housing. A bell housing 30 is mounted above the adapter plate and a clamping plate 32 is provided to secure the bell housing 30 in place. As seen in FIG. 2A and FIG. 2B a pair of tie rods 34 having hexagon heads 35 pass through the plain holes in the crosspieces 21 of the chain mounting unit 16 and are screwed into tapped holes 33 in the adapter plate 28 as seen in FIG. 2. Thus the chain mounting unit 16, the gate valve housing 24 and the adapter plate 28 are clamped together as a complete sub-assembly. The upper ends of the tie rods 34 extend through the clamping plate 32 and nuts 36 are threaded on to the rods to clamp the bell housing 30, by means of the clamping plate 32, to the sub-assembly 28, 24, 16. As clearly seen in the drawings the housing 20, spigot 22, boss 17, adapter plate 28 and clamping plate 32 are all mounted in vertical coaxial alignment.

The upper end of the cylindrical bell housing 30 is formed with a thickened web 38 and a vertical bore 40 is provided centrally of that web.

A bridle 42 is mounted by means of spring urged locating pins 44 which engage holes 46 in the web 38 of the bell housing 30 and a long screw 48 having a hand wheel 50 is threaded through a tapped hole in the top of the bridle.

A shaft 52, having a tool holder 54 formed thereon, passes axially through the web 38 in the bell housing 30, and seals 56 are provided in the web to closely engage the periphery of the shaft.

The shaft is formed with a square head 58 at its upper end, and the tool holder 54 is arranged to hold suitable tools therein as required by the various operations to be performed, as will become clear hereinafter.

Coaxially mounted about a horizontal axis above the main pipeline 2 is a further bell housing 60 and a cutting tool carrier 62. Clamping plates 64 and 66 engage flanges formed on the inner most end portions of the housing 60 and tool carrier 62, and tie bars 68 and nuts 70 act to clamp those members to the housing 20 as shown in the drawings.

The tool carrier 62 has a thickened web 65 similar to the web 38 and is also provided with seals 67 and locating holes 69.

A trepanning cutter 71 having teeth 72 is fast on a shaft 74 which is formed with a square head 76, and the shaft passes sealingly through the seals 67.

The endmost face 78 of the bell housing 60 is provided with a boss 80, and a long stem 82 is mounted for axial movement through a bore formed in the boss. The stem 82 has a knob 84 fixed on to its outer end, and its inner most end is provided with a plate 85 for mounting a carrier strap 86 thereon, the purpose of which will become apparent later. The housing 20 is provided with windows 88 on either side in order that an operator may see the progress of the various operations being performed.

In an alternative arrangement, not shown, the stem 82 is replaced by a thin flexible filamentary member of plastics material which has a noose at its innermost end in place of the strap 86.

The gate valve housing 24 carries a conventional gate valve including a shut off gate 90 (see particularly FIG. 3A) which is actuated by a hand wheel 92.

A description will now follow describing the operations being performed in removing and replacing a redundant domestic water pipe in accordance with the invention.

As seen in FIG. 1A, the main pipeline 2 was provided with an elbow 4 threaded into the wall of the main line. The elbow in this particular example was connected with a lead domestic pipe 8 swaged on to part of the elbow.

In order to remove and replace the lead pipe it is first flattened or crimped and severed at 8A.

The apparatus or machine according to the invention is then assembled in position as follows.

First, the resilient saddle 18 is mounted in position over the main line 2 by first passing it over and around the stub end of the pipe 8 and the elbow 4.

The housing 20 is next fitted on to the spigot 22 on the saddle and the sub-assembly 16, 24 and 28 are located on the cylindrical part 26 of the housing.

The clamping plate 32 is then located over the bell housing 30 to rest against a flange 33 formed toward its lower end, and the shaft 52 is assembled through the bore 40 in the web 38 of the housing. The lower end of the bell housing 30 is located in a counterbore formed in the upper surface of the adapter plate 28, as illustrated in the enlarged part shown in FIG. 1B. Extensions of the tie rods 34 pass through aligned clearance holes in the clamping plate. Nuts 36 are then threaded on to the rods to clamp the bell housing 30 in position.

The chains are next passed beneath the main pipeline 2, their connecting pieces located in notches formed in the end most portions of the arms 19 and the nuts tightened to clamp the body 20, via the saddle 18, to the pipeline. Although the domestic pipe 8 is illustrated as being mounted at right angles to the main line, such a configuration is not always the case. In order to align bell housing 60 and cutter housing 62, the nuts 14 may be slackened slightly and the housing 20 rotated about its axis, the chain mounting being retained in its original position. When the housing 20 is at its correct disposition relative to the direction of the pipe 8, the nuts 36 are re-tightened to clamp the assembly in place.

Before the next stage in the assembly operation the strap is passed around the stub of the pipe 8 and clamped to it by means of a convenient clip device (not shown), after which the bell housing is assembled with respect to the righthand face of the housing 20 as seen in the drawings. The strap is then attached to the plate 85 by access through the left-hand face of the housing 20.

The tool carrier 62, with its assembled cutter 71, is next assembled into position and clamped by the tie bars 68 and nuts 70. The ties bars pass through holes formed in the clamping plates 64 and 66 and the nuts 70 are tightened to firmly clamp the housings 60 and 62 to the housing 20.

The bridle 42 is removed from its position above the bell housing 30 by first pulling out the pins 44 from the locating holes 46 in the housing and withdrawing the bridle vertically.

Figures 3A, 3B:
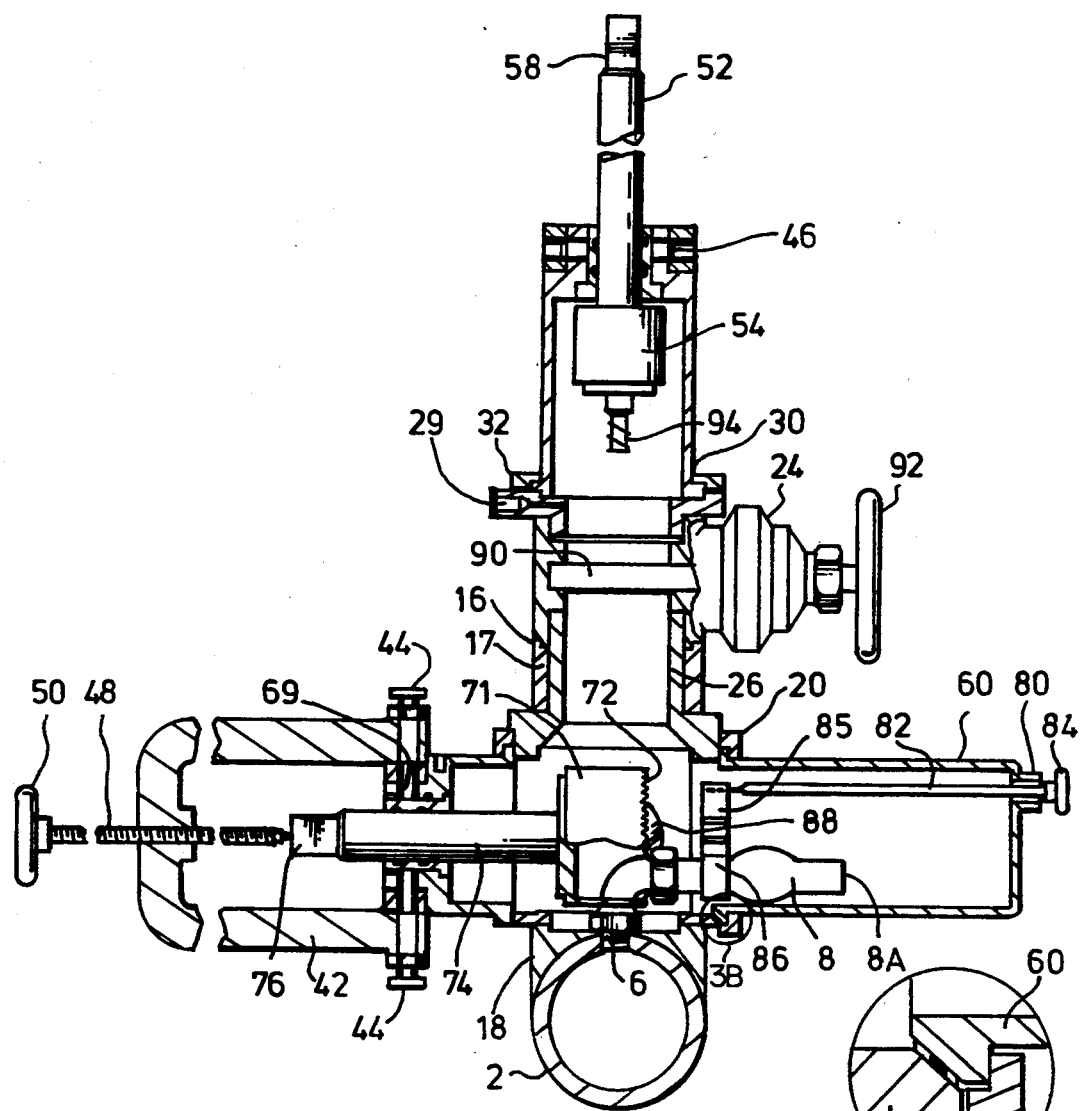
FIG. 3A is a section view showing a cutter device sawing off an elbow from a "live" pipeline.
FIG. 3B is an enlarged partial view of the clamping plate for clamping the bell housing and cutter housing to the body housing.

The shaft 52 is raised to its upper most position as seen in FIG. 3A following which the gate valve may be closed by turning the hand wheel 92.

The bridle 42 is then positioned with respect to the horizontal axis of the cutter housing by locating the pins 44 in the locating holes 69.

Next, a suitable ratchet spanner is placed over the square end 76 of the shaft 74 and the shaft with its cutter 71 are moved towards the elbow 4 by turning the hand wheel 50 to cause the leading end of the screw 48 to engage the end of the shaft as seen in FIG. 3A. The cutter 71 is rotated by means of the ratchet spanner and thus cuts through the elbow above its location in the wall of the main pipe line as it is progressively fed forwardly by rotation of the screw 48.

Because the pipeline 2 is "live" whilst this operation takes place, water under pressure passes from that line into the cavities formed by the bell housing 60, the cutter housing 62 and the housing 20. The water is contained safely within the cavities by virtue of the seal 67 which engages the shaft 74, and suitable O-ring seals (not shown) provided where the housing 62 and the bell housing 60 are clamped against the housing 20, the locating of the lower part of the housing 20 against the resilient saddle 18 and the fact that the gate valve 90 is closed.

Figure 4:
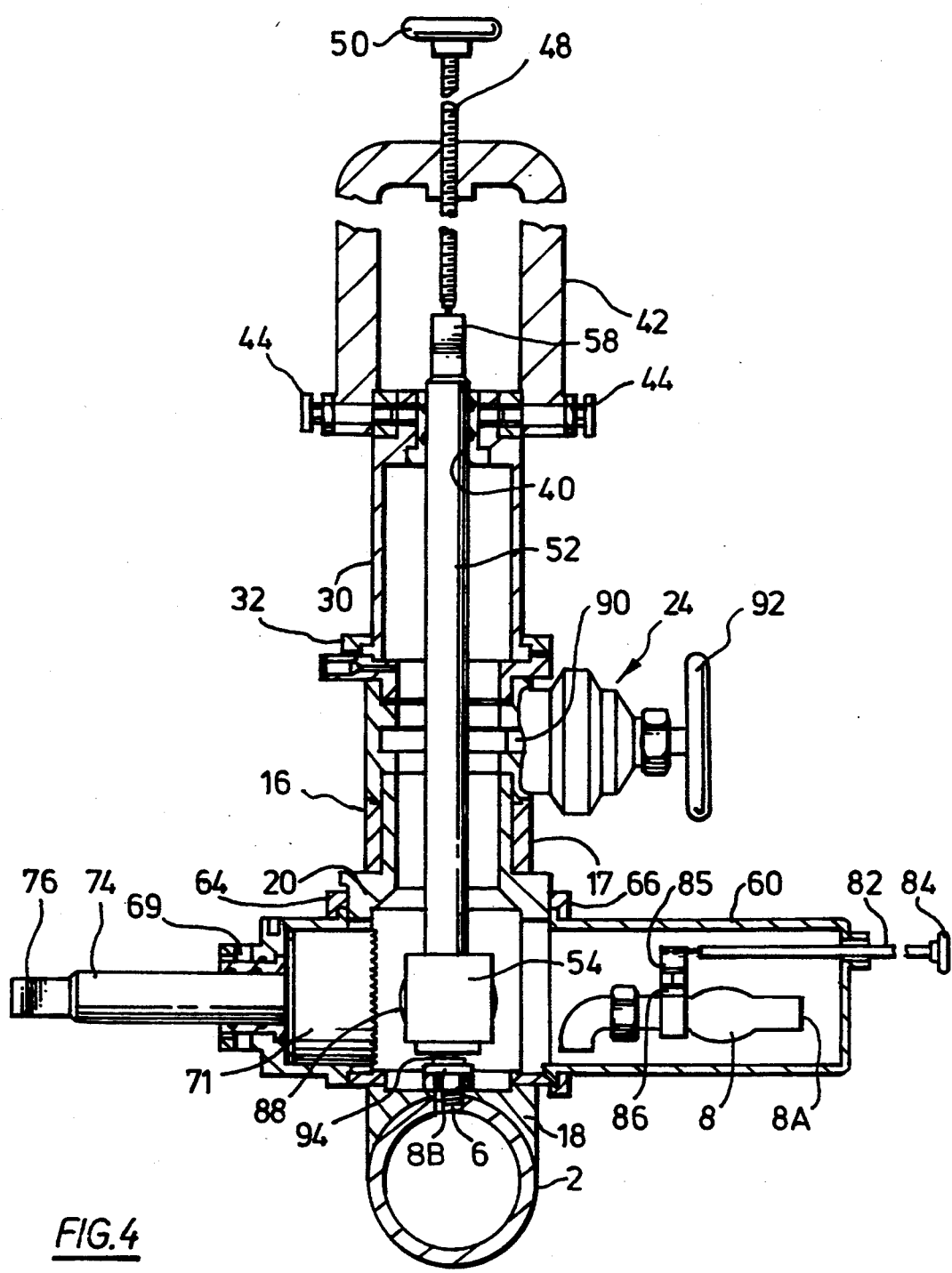
FIG. 4 is a view illustrating removal of a residual portion of the elbow by means of an extractor tool.

The cutter 71 is next manually withdrawn into the cutter housing 62, after retracting the screw 48, and the stem 82 is retracted to withdraw the severed part of the elbow 4 and residual pipe 8 into the bell housing 60, as seen clearly in FIG. 4.

At this state part of the elbow remains screwed in position with respect to the main pipeline 2 and the next task is to remove that part.

With that in mind the bridle 42 is removed from its location with respect to the cutter housing 62 by withdrawing the pins 44 from their locating holes 69 and transferring the bridle to its position above the bell housing 30 as seen in FIG. 1A.

The gate valve 90 is then withdrawn into its open position and a suitable extractor tool 94, as shown in FIGS. 1A and 3A, is lowered to enter the stub 8B of the elbow and is rotated in a counter-clockwise direction by means of a ratchet spanner located on the square end 58 of the shaft 52. Axial pressure may be applied by screwing down the screw 48 by means of its hand wheel 50 during the initial insertion of the extractor tool into the stub 8B of the elbow, but this is removed when the extractor "bites" and the stub begins to rotate and withdraw from the wall of the pipe 2, so that the shaft is allowed to raise freely with the stub. The engagement of the seals 56 and 67 against the periphery of the shafts 52 and 74 respectively prevent water under mainline pressure from passing out of the bell housing 30 and the cutter housing 62.

When the stub 8B has been removed from the pipe 2, the shaft 52 is raised to its full extent to that the tool holder 54, extractor tool 94 together with the removed stub are within the cylindrical bell housing 30. The gate 90 is then closed and pressure within the housing 30 reduced by actuating the bleed valve 29. The nuts 36 are removed from the tie rods 34 and the assembly comprising the bell housing 30, the bridle 42 and shaft 52 with its integral tool holder and extractor tool 94 are removed and the extractor tool is replaced by a further tool or device as required.

For example the removed stub 8B may be replaced by a threaded plug in which case the plug is held in the tool holder 54 and screwed into the existing tapped hole in the pipe 2 first by replacing the bridle/bell housing assembly and then rotating the shaft in a clockwise direction by the ratchet spanner on its squared head 58. The previous outlet to the domestic supply is thus terminated.

As a further example the stub 8B may be replaced by a ferrule assembly, e.g. a swivel type or "banjo" ferrule. This type is well known in the industry and needs no further detailed description here, other than to say that such ferrules can have a plug which prevents water under pressure from the main pipe line flowing therethrough until the "banjo" part of the ferrule is fully connected to the replacement domestic pipe.

Various adaptors may be attached to the tool holder 54 in order to temporarily retain the various plugs, ferrules and other tools and more attachments. Sometimes it is necessary to re-drill and tap the hole in the main pipeline if the original elbow is mutilated and not easily removed. In such a case a drill and a tap are successively attached to the tool holder.

The device and its methods of use thus provide the facility for operating upon and adapting existing pipelines without the need for shutting off the main supply to a number of properties.

It should be noted that although the above description refers to the use of a ratchet spanner to rotate the shaft 52 and 74, a suitable power drive attachment may be used instead.

What is claimed is:

1. A device for severing and replacing a connector from a water supply service pipe including a cutter, a body removably securable in water-tight condition to the service pipe, the body comprising first releasable body means for rotatably supporting said cutter having a shaft which is rotatable in water-tight bearings in said first body means about an axis in a plane parallel to the plane of the axis of the water supply service pipe to sever the connector from its operative connection with the service pipe, and valve means within the body for preventing egress of fluid from the service pipe when the connector is severed therefrom, said body further comprising second releasable body means for rotatably supporting one of a number of different fitment tool means including fitment tool means for holding a replacement connector, and means for urging the rotatable fitment tool means axially toward and away from the water service pipe whereby a replacement connector is attached to the water service pipe in place of the severed connector.

2. A device according to claim 1 wherein said first releasable body means further includes means for urging the rotatable cutter axially toward the connector.

3. A device according to claim 2 wherein said means for urging the rotatable cutter toward the connector further comprises a bridle member releasably connectable to said first releasable body means of the device and a screw member threaded through the bridle member and having means for engaging the cutter, whereby rotation of the screw member in one direction urges the cutter axially into severing engagement with the connector and rotation of the screw member in the opposite direction allows the cutter to move axially away from the connector.

4. A device according to claim 3 wherein the means for releasably connecting the bridle member to the body of the device includes locating pins mounted in the bridle member and adapted to engage within respective holes formed in said first releasable body means of the device.

5. A device according to claim 1 wherein said body further comprises third releasable body means for producing a watertight compartment within the body of the device for supporting, removing and receiving the severed connector into said watertight compartment.

6. A device according to claim 5 wherein the means for supporting and removing the severed connector comprises a linearly moveable rod within said watertight compartment defined by said third releasable body means secured to the body and a sling attached to said rod adapted to support the severed part of the connector.

7. A device according to claim 1 further comprising means for removing a residual portion of the connector from the service pipe after the severed part is removed.

8. A device according to claim 7 wherein the means for removing the residual portion comprises an extractor tool removably secured to a shaft which is rotatable in watertight bearings in said second releasable body means about an axis normal to the plane of the axis of the cutter.

9. A device according to claim 8 further comprising means for urging the shaft toward the residual portion of the connector fitment.

10. A device according to claim 9 wherein the means for urging the shaft toward the residual portion includes a bridle member releasably connectable to said second releasable body means of the body of the device and a screw member threaded through the bridle member and adapted to locate against a free end of the shaft, whereby rotation of the screw member in one direction urges the extractor tool into operative engagement with the residual portion.

11. A device according to claim 10 further comprises said bridle member releasably connectable to said second releasable body means including locating pins mounted in the bridle and adapted to engage within holes formed in said second releasable body means of the device on either side of the axis of the shaft which supports the extractor tool.

12. A device according to claim 1 further comprising means for removably attaching the device to the service pipe, said means including a member located over a spigot which protrudes upwardly from the body, the member having a pair of arms extending laterally therefrom, and a coupling device including a chain adapted to be passed beneath and around the service pipe, there being provided means on the arms for tightening the chain to urge the body towards and into watertight engagement with the water service pipe.

13. A device according to claim 12 wherein a resilient member is interposed between the body and the service pipe to provide water-tight engagement therebetween.

14. A device according to claim 1 wherein the body is provided with at least one window.

15. A method of severing and replacing a connector in an active water service pipe comprising the steps of:
   a) attaching to the active water service pipe a connector severing and removing device including a body portion, a valve member having a valve, a connector supporting and carrying member located within a third releasable body, a rotary cutter within a first releasable body and attached to the body portion, a residue removing fitment tool assembled to a corresponding fitment mounting tool within a second releasable body;
   b) rotating the rotary cutter while urging the rotary cutter towards the connector to sever the connector from its connection with the active water service pipe;
   c) withdrawing the connector into the third releasable body leaving a residual portion of the connector assembled in the active water service pipe;
   d) withdrawing the rotary cutter into the first releasable body:
   e) rotating the residue removing tool while urging it into contact with the residual portion of the connector and further rotating the residue removing tool to remove the residual portion of the connector from the active water service pipe;
   f) withdrawing the residue removing tool with the residual portion of the connector into the second releasable body;
   g) closing the valve of the valve member;
   h) removing the second releasable body from the body portion with the residue removing tool and the residual portion of the connector;
   i) disassembling and removing the residue removing fitment tool and its corresponding fitment mounting tool from the second releasable body:
   j) assembling and inserting within the second releasable body a desired fitment tool of a number of different fitment tools including a drilling tool, a tapping tool, a plug holding tool, a ferrule holding tool to a corresponding fitment mounting tool to carry out a desired operation on the active water service pipe and re-attaching the third housing to the body portion;
   k) opening the valve of the valve member;
   l) actuating the desired fitment tool to carry out the desired operation on the active water service pipe including the operation of re-drilling or tapping the hole in the water service pipe, inserting a plug into the existing threaded hole in the water service pipe, inserting a new ferrule into the water service pipe, and replacing the connector in the water service pipe.

16. A device for severing and replacing a connector from an active water supply service pipe including a body removably securable in watertight condition to the active water service pipe; a number of fitment tools including a cutting tool, a drilling tool, a tapping tool, a plug holding tool, a ferrule holding tool; an extractor tool; fitment mounting tool means corresponding to each of said fitment tools for releasably attaching a desired fitment tool to the body, said body providing means for rotatably supporting said cutting tool to sever the connector from its operative connection with the active water supply service pipe whereby the connector has a severed part and a residual portion, and valve means within the body for preventing egress of fluid from the active water supply service pipe when the connector is severed therefrom; said extractor tool defining means for removing said residual portion of the connector from the active water service pipe after the severed part is removed, said extractor tool being removably secured to a shaft which is rotatable in watertight bearings in the body about an axis normal to the plane of the axis of the connector severing means.

* * * * *